Dec. 20, 1949     C. O. ROLANDO     2,491,769
PHOTOGRAPHIC APPARATUS

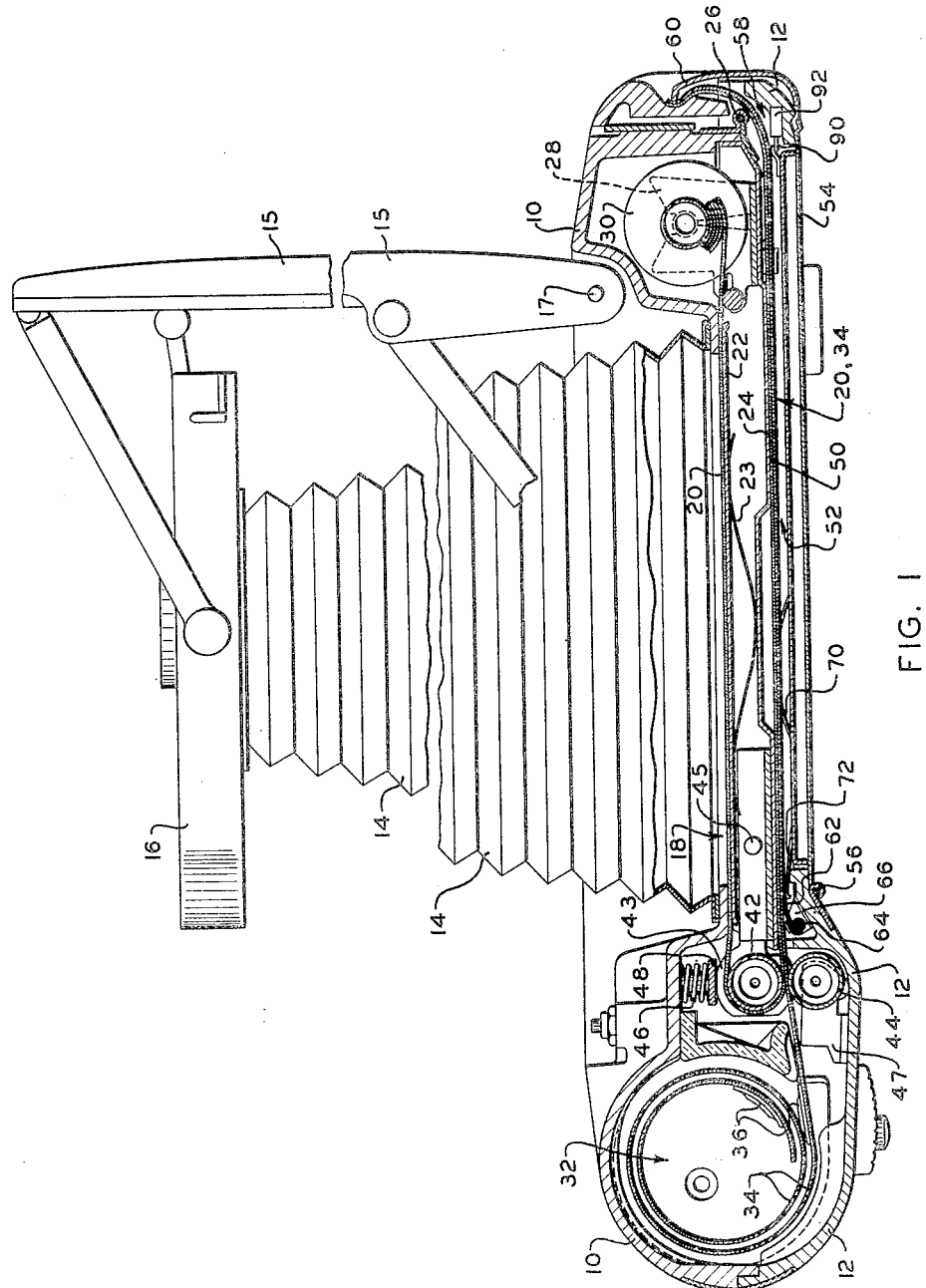

Filed Sept. 2, 1948     2 Sheets-Sheet 2

INVENTOR
Charles O. Rolando
BY Donald L. Brown
and Oliver H. Hayes
Attorneys

Patented Dec. 20, 1949

2,491,769

UNITED STATES PATENT OFFICE 2,491,769

PHOTOGRAPHIC APPARATUS

Charles O. Rolando, Belmont, Mass., assignor to Polaroid Corporation, Cambridge, Mass., a corporation of Delaware Application September 2, 1948, Serial No. 47,352

14 Claims. (Cl. 95—13)

This invention relates to photography and more particularly to novel photographic apparatus, such as a camera, wherein negative and positive images may be concurrently produced by having negative and positive sheets in face-to-face relation and releasing a liquid from a container carried by one of said sheets and spreading said liquid between the two sheets. In a preferred form of camera there is provided a dark chamber in the rear of the camera into which the processed sheets are fed, the image-forming reactions being carried out while the sheets remain in this dark chamber. A door is provided in the camera for removing, at the end of a predetermined processing time, a positive image area from the positive sheet, this area carrying thereon a positive image.

The principal object of the present invention is to provide improved means in such a camera for preventing access of light to the unprocessed photosensitive material when the previously-processed positive image area is removed through the rear door of the camera.

Another object of the invention is to provide such improved light-sealing means which assist in separating the positive image area from the remainder of the two sheets which are laminated together by the processing liquid.

Still another object of the invention is to provide such a light seal where the parts thereof additionally assist in guiding the two sheet materials and which is simple and cheap to manufacture.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a diagrammatic fragmentary sectional view of one preferred modification of the invention as embodied in a hand-held camera;

Figure 1A:
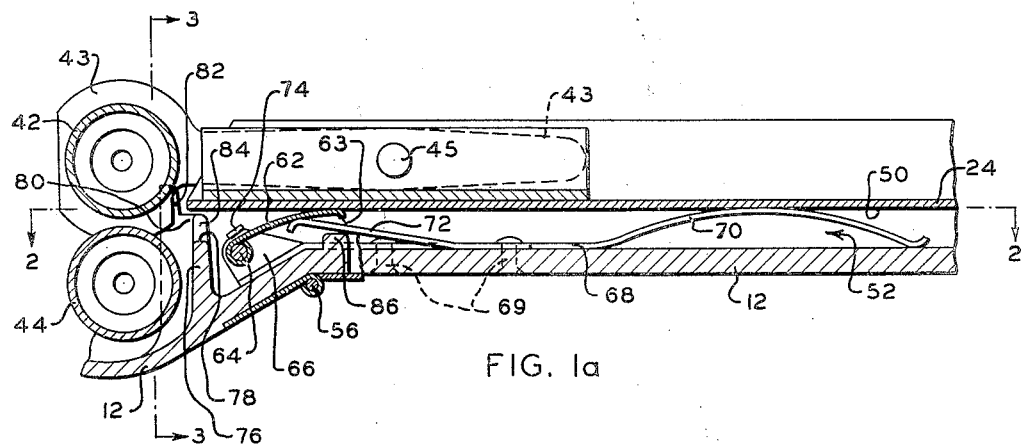
Fig. 1a is an enlarged view of a portion of Fig. 1, the section of Fig. 1a being taken along the line 1a—1a of Fig. 2, and the two sheets being omitted from the drawing for clarity of illustration.
Figure 2:
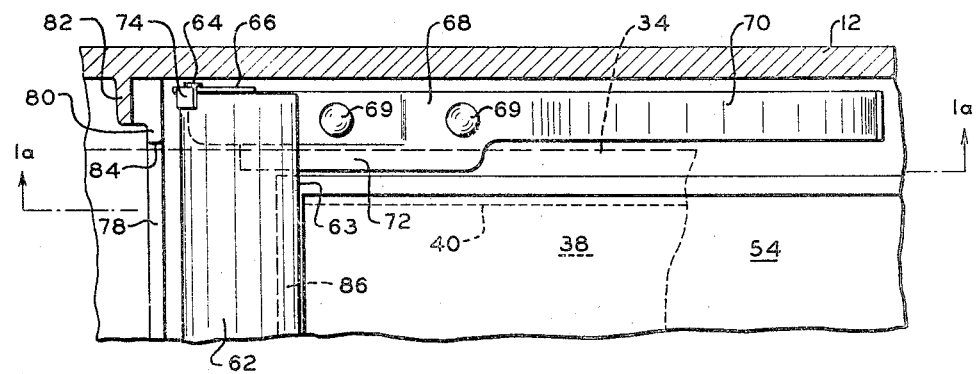
Figure 3:
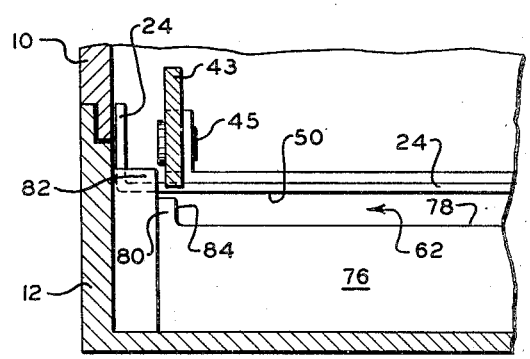

Fig. 2 is an enlarged diagrammatic fragmentary sectional view of Fig. 1a taken along the line 2—2, the image-carrying sheet being shown in superposition on this figure in dotted lines and the pressure rolls 42, 44 being omitted; and Fig. 3 is an enlarged diagrammatic fragmentary sectional view of Fig. 1a taken along the line 3—3 with pressure rolls 42, 44 being omitted.

In a preferred type of hand-held camera embodying the present invention and illustrated in the drawings, the camera comprises a front housing, a rear housing and a partition extending between these two housings. Means are positioned in the camera for holding the two sheets. In a preferred form, there is one such means adjacent one end of the camera for holding a supply, such as a roll, of the photosensitive film and means are provided, preferably adjacent the other end of the camera, for holding a supply, such as a second roll, of sheetlike material. One of these two rolls of material preferably supports a plurality of liquid-carrying containers. An exposure opening is provided in the front housing and a door is included in the rear housing, the partition defining an exposure chamber with the front housing and defining a dark chamber with the rear housing, the door serving to provide access to the dark chamber. The camera also includes a processing means, preferably comprising a pair of pressure-applying members, positioned between the exposure opening and the second roll-holding means and arranged to release the processing liquid from the container and to spread this released liquid between the two sheetlike materials upon movement of the sheetlike materials in superposition between the pressure-applying members.

This invention is primarily directed to means for preventing light passing from the dark chamber to and beyond the pressure-applying members when the rear door is opened to remove a processed image area. In a preferred form of the invention the light-seal means comprises a member extending transversely of the dark chamber and preferably positioned between the door and the pressure-applying members. Means are provided for mounting this light-seal member so that a transverse edge thereof near the door may move towards the partition and means are included for resiliently urging this edge of the light-seal member towards the partition. A preferred arrangement of the light-seal member also includes means for preventing more than a predetermined amount of movement of the light-seal member towards the partition. Wall means are preferably associated with the rear housing adjacent the mounting means for the light-seal member and between these mounting means and the pressure members, these wall means serving to prevent light, which passes under and around the ends of the light-seal member, from reaching the pressure members.

In a preferred type of image-carrying sheet which is to have a positive image formed on its surface, the areas thereof adapted to carry this positive image are preferably defined by perforations which assist in the tearing out of these image-area portions from the remainder of the sheet. In the normal use of the camera, when the two sheets are processed, this image-area portion is positioned in superposition with the door so that, when the door is opened, this positive image-area portion may be removed from the remainder of the image-carrying sheet by tearing along the perforations. In a preferred construction of the light-seal member, this light-seal member is adapted to serve as a tearing edge for assisting in tearing the transverse trailing edge of the positive image area. The preferred type of camera includes a reinforcing ridge adjacent the corresponding transverse edge of the door which constitutes a firm support for the light-seal member when it is acting as a tearing edge during the removal of a positive image-area portion of the processed sheet.

Referring now to the various figures, there is shown one preferred form of the invention as embodied in a hand-held camera. This camera comprises a front housing 10 and a rear housing 12 pivoted at 13 thereto. The front housing 10 has secured thereto a bellows 14 and a shutter housing schematically indicated at 16. A cover 15, pivotally secured at 17 to front housing 10, suitably supports the shutter housing 16 in proper spaced relationship to the camera body. An exposure opening 18, in the front housing 10, permits exposure of a photosensitive sheet 20 supported behind this opening 18 by means of a backing plate 22. Backing plate 22 is supported by a spring member 23 on a partition member 24 hinged, as at 26, to the front housing 10. Also preferably carried by the partition 24 is a spool holder 28 carrying a spool 30 of the photosensitive film 20. At the other end of the camera there is provided a chamber 32, preferably defined by front housing 10 and rear housing 12, for holding a roll of image-carrying sheet 34. A plurality of containers 36 are shown as being carried by sheet 34. Each image-carrying sheet 34 includes an image-area portion 38 (see Fig. 2) defined by a plurality of perforations 40. The processing means, which are shown in a preferred form as being positioned between the end of the exposure opening and the holder for the receiving sheet 34, comprise a pair of pressure-applying members such as a pair of pressure rolls 42 and 44. Roll 42 is preferably carried by a pair of arms 43, pivotally mounted on the partition 24 as by means of pins 45, and pressure roll 44 is preferably rigidly secured to rear housing 12, such as by means of brackets 47. A spring 46 and a pressure bar 48 apply a predetermined resilient load on the two rolls when they are in the position shown in Fig. 1.

The rear surface 50 of the partition member 24 defines, with the rear housing 12, a dark chamber 52. A door 54, hinged at 56, is included in the rear housing 12 to provide access to the dark chamber 52. A discharge opening 58, in the right-hand end of the chamber 52, is normally closed by means of a cutter bar 60 positioned exteriorly thereof, this cutter bar 60 being arranged to permit severance of those portions of the two sheets which serve as leaders for moving a succeeding image area into the dark chamber.

The light-sealing means for preventing light from reaching the pressure rolls, when the door 54 is opened, comprises, in a preferred form, a bladelike member 62 mounted on the rear housing 12 and extending transversely of the dark chamber 52 between the end of the door 54 and the pressure rolls 42, 44. The mounting for this bladelike member, shown in greater detail in Figs. 1a and 2, comprises a pivot pin 64 held by a pair of brackets 66. These brackets 66 are preferably formed integrally with a pair of spring elements 68, there being one spring element 68 secured, as by means of rivets 69, to rear housing 12 at each longitudinal edge of the door 54. Each spring element 68 preferably includes a spring arm 70 which is adapted to engage the rear surface 50 of the partition member 24 so as to resiliently urge the partition member 24 towards the exposure opening 18 in the camera. Another arm 72, of the spring element 68, is shown as being considerably narrower than the arm 70. Arm 72 is thus a weaker spring than arm 70 and is adapted to engage the rear side of the light-seal blade member 62, thus tending to rotate member 62 in a counterclockwise direction around the pivot 64, consequently urging the outer edge 63 of the light-seal blade member towards the rear surface 50 of the partition member. A stop means 74 is preferably included as a part of each support bracket 66, this stop acting to prevent more than a predetermined amount of rotation of the bladelike light-seal member 62 around its pivot pin 64.

For forming an additional light seal under the pivot pin 64 and around the ends of the light-seal blade 62, there is provided a wall member 76, this wall being preferably formed as an integral part of rear housing 12. The construction of wall 76 is best shown in Figs. 1a and 3. Intermediate portions 78 of the wall 76 extend above the pivot pin 64 and below the plane of the rear surface 50 of the partition member 24. Intermediate end portions 80 of the wall member 76 extend substantially to the plane of the surface 50, while the extreme end portions 82 of the wall 76 extend beyond the plane of surface 50. The facing inner surfaces 84, of the two intermediate end wall portions 80, form sheet-edge-guiding means for the two laminated sheets as they are advanced into the dark chamber 52. This feature of the invention is best seen in Fig. 2, wherein the normal position of the image-carrying sheet 34 is shown in dotted lines.

In a preferred type of camera embodying the present invention, the rear door is provided with a timing device which operates to prevent opening of the door until a predetermined time after the positioning of the two sheets 20, 34 within the dark chamber. This timing device comprises a latch 90 and a timing mechanism 92 for operating the latch. The timing mechanism is preferably rendered operative to start its timing cycle upon movement of the cutter bar 60 from open position to the position shown. At the end of a predetermined time after such movement, the timing device releases latch 90 and door 54 may be opened, at least part of this opening being preferably accomplished by spring 70. Equally, the timing mechanism 92 may be rendered operative by operation of some other portion of the camera such as the pressure rolls 42, 44 or the stop (not shown) which positions the photosensitive and image areas prior to exposure.

As can be seen best in Fig. 1a, the outer end 63 of the light-seal blade 62 comprises a bent-over stiffening rib. This rib 63 is arranged to contact a stiffening ridge 86 forming a stop on the rear housing 12 adjacent the end of the door 54.

In a preferred form of process useful with the camera of the present invention, the photosensitive layer 20 comprises a silver halide photosensitive emulsion carried by a suitable base such as paper. With such an emulsion, the image-carrying sheet 34 preferably comprises baryta paper having the containers 36 secured thereto at predetermined spaced intervals. The liquid carried by the containers 36 preferably comprises a viscous alkaline aqueous solution of a developer, a silver halide solvent and a film-forming material.

A preferred form of camera comprises a die-cast aluminum body whose interior is painted black. The light-seal blade is preferably formed of brass, while the spring member 68 is formed of phosphor bronze, both of these elements being given a dull black finish.

In the use of the camera described above, the camera is first opened by rotating the rear housing 12 around hinge 13 and then swinging partition member 24 around pivot 26 to expose the spool holder 28. When the camera is opened the stop member 74, associated with the bracket 66, prevents more than a predetermined amount of rotation of the light-seal blade 62 around its pivot pin 64. The spool 30, carrying a roll of photosensitive film 20, is inserted in the spool holder 28 and the leader portion of the film is led across the backing plate 22, positioned between the arms 43 and then led around pressure roll 42. The partition member 24 is then moved to the position shown in Fig. 1 and then the roll of image-carrying sheet 34 is positioned in the holder 32. The leader portion of the image-carrying sheet is aligned with the leader portion of photosensitive sheet 20 and these two leaders are guided along the rear surface 50 of the partition member 24 until they extend from the end of the camera. Rear housing 12 is then moved to closed position, thus bringing the pressure roll 44 into operative relationship with the pressure roll 42. This movement of the rear housing 12 also brings the spring arm 70 into position so that it resiliently engages the marginal edge of the rear surface 50 of the partition 24 and also brings the edge-guiding surfaces 84, on the light-seal wall 76, into position adjacent the edges of the two sheets extending into the dark chamber 52. The leaders of the two sheets are then pulled till the first photosensitive area of the photosensitive sheet 20 is in exposure position behind exposure opening 18, this positioning being indicated by a stop or other means such as suitable marks on the leaders. This movement of the leaders advances a corresponding portion of the image-carrying sheet 34 from the holder 32 so that a container 36 is just about to enter the bite of the pressure rolls 42, 44. The excess leader stock may now be cut off by moving the cutter bar 60 to the position shown and tearing the leader stock against bar 60. Exposure is now made and the two sheets are pulled by moving the cutter bar 60 and grasping those portions of the two leaders under the cutter bar. The pulling movement of the two leaders releases and spreads the processing liquid between the two sheets and laminates these two sheets together. As this spreading takes place the sheets are advanced into the dark chamber 52, the sheets being guided by the surfaces 84. Pulling is continued until the exposed area of the photosensitive sheet, and the corresponding positive image area on the image-carrying sheet 34, are in superposition behind the door 54. The cutter bar 60 is then moved to operative position, thus starting the timing cycle, the portions of the two sheets protruding from the camera being cut off and discarded. At the end of about one minute or so, when the processing is substantially completed and a positive image is formed on the image area 38, latch 90 is released by the timing mechanism 92 and the door 54 is opened.

When the door is opened, the light-seal blade 62 is in engagement with the rear surface of the two sheets and prevents light from passing directly to the pressure rolls 42, 44. The intermediate portions 78 of the wall 76 prevent direct light from passing under the pivot pin 64, while the end portions 80 and 82 of the wall 76 prevent any light, which might pass the end of the light-seal blade, from reaching the pressure rolls 42, 44. The right-hand end of the image area 38 is now engaged and separated from the lamination, this separation being facilitated by the perforations 40 defining the area 38. As the removal of the image area 38 continues towards the left-hand end of the door 54, the light-seal blade 62 is rotated so that the end 63 thereof engages the stop ridge 86 and forms a stiff tearing edge for tearing the transverse trailing edge of the image area 38, thus facilitating removal of the image area 38.

While a preferred form of the invention has been described above it should be understood that numerous modifications of the specific construction shown may be accomplished without departing from the scope of the invention. For example, the image-carrying sheet may be transparent, in which case the two sheets may be formed into a single roll and the exposure of the photosensitive area may be accomplished by directing the exposure light through the image-carrying sheet. With this arrangement, a positive transparency is easily obtained on the image-carrying sheet. Equally, different processing materials may be employed and the invention may be employed in other types of cameras such as photocopy machines where no lens system is employed.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A camera comprising a housing, means for holding a supply of photosensitive sheet material and a supply of a second sheet material, one of said two sheet materials supporting a plurality of liquid-carrying containers, portions of said housing defining an exposure chamber, an exposure opening in said housing communicating with said exposure chamber, other portions of said housing defining a dark chamber, a door in said housing providing access to said dark chamber, processing means comprising a pair of pressure-applying members positioned adjacent said exposure opening and arranged to release a processing liquid from one of said containers and spread said released liquid between said two sheet materials upon movement of said sheet materials in superposition between said pressure-applying members, a bladelike light-seal member extending transversely of said dark chamber adjacent that end thereof nearest said pressure members and between said door and said pressure members, means for mounting said bladelike member so that said bladelike member may pivot around one of its transverse edges, means for resiliently urging the free edge of said bladelike member towards a wall of said dark chamber, and means for preventing more than a predetermined amount of movement of said bladelike member under influence of said urging means.

2. A camera comprising a housing for holding a supply of photosensitive sheet material and a supply of a second sheet material, one of said sheets of material supporting a plurality of liquid-carrying containers, an exposure opening in said housing, a door in said housing, means defining an exposure chamber with portions of said housing and defining a dark chamber with other portions of said housing, said door serving to provide access to said dark chamber, processing means comprising a pair of pressure-applying members positioned adjacent said exposure opening and arranged to release a processing liquid from one of said containers and spread said released liquid between said two sheet materials upon movement of said sheet materials in superposition between said pressure-applying members, a bladelike member extending transversely of said dark chamber adjacent that end thereof nearest said pressure members and between said door and said pressure members, means for mounting said bladelike member on said housing member so that said bladelike member may pivot around one transverse edge thereof, means for resiliently urging the free edge of said bladelike member towards said dark chamber-defining means, and means for preventing more than a predetermined amount of movement of said bladelike member under influence of said urging means.

3. A camera comprising a front housing member, a rear housing member, a partition member extending between said housings, means for holding a supply of photosensitive sheet material and a supply of a second sheet material, one of said sheets of material supporting a plurality of liquid-carrying containers, an exposure opening in said front housing member, a door in said rear housing member, one surface of said partition member defining an exposure chamber with said front housing, said partition having a substantially planar surface defining a dark chamber with said rear housing, said door serving to provide access to said dark chamber, processing means comprising a pair of pressure-applying members positioned adjacent said exposure opening and arranged to release a processing liquid from one of said containers and spread said released liquid between said two sheet materials upon movement of said sheet materials in superposition between said pressure-applying members, a bladelike member extending transversely of said dark chamber adjacent that end thereof nearest said pressure members and between said door and said pressure members, means for mounting said bladelike member on said rear housing member so that one edge of said bladelike member is free to move towards said partition member, means for resiliently urging the free edge of said bladelike member towards said partition member, means for preventing more than a predetermined amount of movement of said bladelike member under influence of said urging means, said bladelike member extending from said mounting in a direction along which said superposed sheets are moved into said dark chamber, and a wall member on said rear housing substantially normal to the plane of said planar surface on said partition member and extending parallel to said edge of said bladelike member, intermediate portions of said wall extending, in a direction normal to said plane, beyond said mounting means but not beyond said plane, end portions of said wall extending beyond said plane, said wall being positioned between said mounting means and said processing members.

4. A camera comprising a front housing member, a rear housing member, a partition member extending between said housings, means for holding a supply of photosensitive sheet material and a supply of a second sheet material comprising an image-carrying sheet having a plurality of image areas thereon, each said area being at least partially defined by perforations surrounding said area, one of said sheets supporting a plurality of liquid-carrying containers, an exposure opening in said front housing member, a door in said rear housing member, said partition defining an exposure chamber with said front housing and defining a dark chamber with said rear housing, said door serving to provide access to said dark chamber, processing means comprising a pair of pressure-applying members positioned adjacent said exposure opening and arranged to release a processing liquid from one of said containers and spread said released liquid between said two sheet materials upon movement of said sheet materials in superposition between said pressure-applying members, a bladelike member extending transversely of said dark chamber adjacent that end thereof nearest said pressure members and between said door and said pressure members, means for mounting said bladelike member on said rear housing member so that said bladelike member may pivot around one transverse edge thereof, and means for resiliently urging the free edge of said bladelike member towards said partition member, one side of said partition member defining an exposure plane and the other side of said partition member defining a processing plane, said bladelike member defining, with said second side of said partition member, a light-tight opening into said dark chamber.

5. A camera comprising a front housing member, a rear housing member, a partition member extending between said housings, means for holding a supply of photosensitive sheet material and a supply of a second sheet material comprising an image-carrying sheet having a plurality of image areas thereon, each said area being at least partially defined by perforations surrounding said area, one of said sheets supporting a plurality of liquid-carrying containers, an exposure opening in said front housing member, a door in said rear housing member, said partition defining an exposure chamber with said front housing and defining a dark chamber with said rear housing, said door serving to provide access to said dark chamber, processing means comprising a pair of pressure-applying members positioned adjacent said exposure opening and arranged to release a processing liquid from one of said containers and spread said released liquid between said two sheet materials upon movement of said sheet materials in superposition between said pressure-applying members, a bladelike member extending transversely of said dark chamber adjacent that end thereof nearest said pressure members and between said door and said pressure members, means for mounting said bladelike member on said rear housing member so that said bladelike member may pivot around one transverse edge thereof, means for resiliently urging the free edge of said bladelike member towards said partition member, means for preventing more than a predetermined amount of movement of said bladelike member under influence of said urging means, and means for preventing more than a predetermined amount of movement of said free edge of said bladelike member towards said rear housing member, said last-named means reinforcing said free edge so that said edge may serve as a tear-off edge for severing an image-area portion from said superposed sheet materials in said dark chamber.

6. A camera comprising a front housing member, a rear housing member, a partition member extending between said housings, means for holding a supply of photosensitive sheet material and a supply of a second sheet material, one of said sheets of material supporting a plurality of liquid-carrying containers, an exposure opening in said front housing member, a door in said rear housing member, said partition defining an exposure chamber with said front housing, said partition having a substantially planar surface defining a dark chamber with said rear housing, said door serving to provide access to said dark chamber, processing means comprising a pair of pressure-applying members positioned adjacent said exposure opening and arranged to release a processing liquid from one of said containers and spread said released liquid between said two sheet materials upon movement of said sheet materials in superposition between said pressure-applying members, a bladelike member extending transversely of said dark chamber adjacent that end thereof nearest said pressure members and between said door and said pressure members, a pivot pin secured to said rear housing for mounting said bladelike member on said rear housing member so that said bladelike member may pivot around one transverse edge thereof, means for resiliently urging the free edge of said bladelike member towards said planar surface on said partition member, means for preventing more than a predetermined amount of movement of said bladelike member under influence of said urging means, said pivot pin being spaced from said rear housing member, and an inwardly extending wall on said rear housing normal to the plane of said partition member surface but spaced therefrom, said wall extending from said rear housing member beyond said pivot pin.

7. A camera comprising a front housing member, a rear housing member, a partition member extending between said housings, means for holding a supply of photosensitive sheet material and a supply of a second sheet material, one of said sheets of material supporting a plurality of liquid-carrying containers, an exposure opening in said front housing member, a door in said rear housing member, said partition defining an exposure chamber with said front housing and defining a dark chamber with said rear housing, said door serving to provide access to said dark chamber, processing means comprising a pair of pressure-applying members positioned adjacent said exposure opening and arranged to release a processing liquid from one of said containers and spread said released liquid between said two sheet materials upon movement of said sheet materials in superposition between said pressure-applying members, a bladelike member extending transversely of said dark chamber adjacent that end thereof nearest said pressure members and between said door and said pressure members, means for mounting said bladelike member on said rear housing member so that said bladelike member may pivot around one transverse edge thereof, means for resiliently urging the free edge of said bladelike member towards said partition member, one side of said partition member defining an exposure plane and the other side of said partition member defining a processing plane, said bladelike member defining, with said second side of said partition member, a light-tight opening into said dark chamber, and a wall member on said rear housing substantially normal to said processing plane and extending parallel to said bladelike member, intermediate portions of said wall extending in a direction normal to said plane beyond said pivot pin but not beyond said plane, end portions of said wall extending beyond said plane, said wall being positioned between said pivot pin and said processing members, facing surfaces of said two end portions of said wall being arranged to guide the two edges of said superposed sheets as they enter said dark chamber.

8. A camera comprising a front housing member, a rear housing member, a partition member extending between said housings, means for holding a supply of photosensitive sheet material and a supply of a second sheet material, one of said sheets supporting a plurality of liquid-carrying containers, an exposure opening in said front housing member, a door in said rear housing member, said partition defining an exposure chamber with said front housing and defining a dark chamber with said rear housing, said door serving to provide access to said dark chamber, processing means comprising a pair of pressure-applying members positioned adjacent said exposure opening and arranged to release a processing liquid from one of said containers and spread said released liquid between said two sheet materials upon movement of said sheet materials in superposition between said pressure-applying members, a bladelike member extending transversely of said dark chamber adjacent that end thereof nearest said pressure members and between said door and said pressure members, means for mounting said bladelike member on said rear housing member so that said bladelike member may pivot around one transverse edge thereof, means for resiliently urging the free edge of said bladelike member towards said partition member, means for preventing more than a predetermined amount of movement of said bladelike member under influence of said urging means, and a pair of spring members carried by said rear housing adjacent the longitudinal edges of said door, portions of said spring members being positioned to bear adjacent longitudinal edges of said partition member so as to resiliently urge said partition towards said exposure opening, extensions on said spring members bearing on said bladelike member and constituting said urging means.

9. A camera comprising a front housing member, a rear housing member, a partition member extending between said housings, means for holding a supply of photosensitive sheet material and a supply of a second sheet material, one of said sheets supporting a plurality of liquid-carrying containers, an exposure opening in said front housing member, a door in said rear housing member, said partition defining an exposure chamber with said front housing and defining a dark chamber with said rear housing, said door serving to provide access to said dark chamber, processing means comprising a pair of pressure-applying members positioned adjacent said exposure opening and arranged to release a processing liquid from one of said containers and spread said released liquid between said two sheet materials upon movement of said sheet materials in superposition between said pressure-applying members, a bladelike member extending transversely of said dark chamber adjacent that end thereof nearest said pressure members and between said door and said pressure members, means for mounting said bladelike member on said rear housing member so that said bladelike member may pivot around one transverse edge thereof, means for resiliently urging the free edge of said bladelike member towards said partition member, means for preventing more than a predetermined amount of movement of said bladelike member under influence of said urging means, and a pair of spring members carried by said rear housing adjacent the longitudinal edges of said door, portions of said spring members being positioned to bear adjacent longitudinal edges of said partition member so as to resiliently urge said partition towards said exposure opening, extensions on said spring members bearing on said bladelike member and constituting said urging means, other portions of said spring members extending at an angle to said rear housing and serving as said mounting means, the ends of said angular portions being bent inwardly to serve as said first-mentioned preventing means.

10. A camera comprising a front housing member, a rear housing member, a partition member extending between said housing members, means for holding a supply of photosensitive sheet material and a supply of a second sheet material, one of said sheet materials supporting a plurality of liquid-carrying containers, an exposure opening in said front housing member, a door in said rear housing member, said partition defining an exposure chamber with said front housing member and defining a dark chamber with said rear housing member, said door serving to provide access to said dark chamber, processing means comprising a pair of pressure-applying members positioned adjacent said exposure opening and arranged to release a processing liquid from one of said containers and spread said released liquid between said two sheet materials upon movement of said sheet materials in superposition between said pressure-applying members, a bladelike member extending transversely of said dark chamber adjacent that end thereof nearest said pressure members and between said door and said pressure members, means for mounting said bladelike member on said rear housing member so that said bladelike member may pivot around one transverse edge thereof, means for resiliently urging the free edge of said bladelike member towards said partition member, and means for preventing more than a predetermined amount of movement of said bladelike member under influence of said urging means, the free edge of said bladelike member extending into substantial alignment with that edge of said door nearest said pressure members, the free edge of said bladelike member having a stiffening lip.

11. A camera comprising a front housing member, a rear housing member, a partition member extending between said housings, means for holding a supply of photosensitive sheet material and a supply of a second sheet material, one of said sheet materials supporting a plurality of liquid-carrying containers, an exposure opening in said front housing member, a door in said rear housing member, said partition defining an exposure chamber with said front housing and defining a dark chamber with said rear housing, said door serving to provide access to said dark chamber, processing means comprising a pair of pressure-applying members positioned adjacent said exposure opening and arranged to release a processing liquid from one of said containers and spread said released liquid between said two sheet materials upon movement of said sheet materials in superposition between said pressure-applying members, a bladelike member extending transversely of said dark chamber adjacent that end thereof nearest said pressure members and between said door and said pressure members, means for mounting said bladelike member on said rear housing member so that said bladelike member may pivot around one transverse edge thereof, means for resiliently urging the free edge of said bladelike member towards said partition member, means for preventing more than a predetermined amount of movement of said bladelike member under influence of said urging means, the free edge of said bladelike member extending into substantial alignment with that edge of said door nearest said pressure members, the free edge of said bladelike member having a stiffening lip, and a stop member positioned adjacent said edge of said door for preventing more than a predetermined movement of said lip with respect to said rear housing.

12. A camera comprising a front housing member, a rear housing member, a partition member extending between said housings, means for holding a supply of photosensitive sheet material and a supply of a second sheet material comprising an image-carrying sheet having a plurality of image areas thereon, each said area being at least partially defined by perforations surrounding said area, one of said sheets supporting a plurality of liquid-carrying containers, an exposure opening in said front housing member, a door in said rear housing member, said partition defining an exposure chamber with said front housing and defining a dark chamber with said rear housing, said door serving to provide access to said dark chamber, processing means comprising a pair of pressure-applying members positioned adjacent said exposure opening and arranged to release a processing liquid from one of said containers and spread said released liquid between said two sheet materials upon movement of said sheet materials in superposition between said pressure-applying members, a light-seal member extending transversely of said dark chamber adjacent that end thereof nearest said pressure members and between said door and said pressure members, means for mounting said light-seal member so that a transverse edge thereof near said door may move towards said partition, means for resiliently urging said edge towards said partition, means for preventing more than a predetermined amount of movement of said light-seal member towards said partition, and wall means associated with said rear housing adjacent said mounting means and between said mounting means and said pressure members for preventing any light which passes around the ends of said light-seal member from reaching said pressure-applying members.

13. A camera comprising a front housing member, a rear housing member, a partition member extending between said housings, means for holding a supply of photosensitive sheet material and a supply of a second sheet material comprising an image-carrying sheet having a plurality of image areas thereon, each said area being at least partially defined by perforations surrounding said area, an exposure opening in said front housing member, a door in said rear housing member, said partition defining an exposure chamber with said front housing and defining a dark chamber with said rear housing, said door serving to provide access to said dark chamber, processing means comprising a pair of pressure-applying members positioned adjacent said exposure opening and arranged to spread between said two sheet materials a processing liquid positioned therebetween upon movement of said sheet materials in superposition between said pressure-applying members, a bladelike member extending transversely of said dark chamber adjacent that end thereof nearest said pressure members and between said door and said pressure members, means for mounting said bladelike member on said rear housing member so that said bladelike member may pivot around one transverse edge thereof, means for resiliently urging the free edge of said bladelike member towards said partition member, means for preventing more than a predetermined amount of movement of said bladelike member under influence of said urging means, and means for preventing more than a predetermined amount of movement of said free edge of said bladelike member towards said rear housing member, said last-named means reinforcing said free edge so that said edge may serve as a tear-off edge for severing an image-area portion from said superposed sheet materials in said dark chamber.

14. A camera comprising a front housing member, a rear housing member, a partition member extending between said housings, means for holding a supply of photosensitive sheet material and a supply of a second sheet material, one of said sheets supporting a plurality of liquid-carrying containers, an exposure opening in said front housing member, a door in said rear housing member, said partition defining an exposure chamber with said front housing and defining a dark chamber with said rear housing, said door serving to provide access to said dark chamber, processing means comprising a pair of pressure-applying members positioned adjacent said exposure opening and arranged to release a processing liquid from one of said containers and spread said released liquid between said two sheet materials upon movement of said sheet materials in superposition between said pressure-applying members, a bladelike member extending transversely of said dark chamber adjacent that end thereof nearest said pressure members and between said door and said pressure members, means for mounting said bladelike member on said rear housing member so that said bladelike member may pivot around one transverse edge thereof, means for resiliently urging the free edge of said bladelike member towards said partition member, means for preventing more than a predetermined amount of movement of said bladelike member under influence of said urging means, and a pair of spring members carried by said rear housing adjacent the longitudinal edges of said door, portions of said spring members being positioned to bear adjacent longitudinal edges of said partition member so as to resiliently urge said partition towards said exposure opening, extensions on said spring members bearing on said bladelike member and constituting said urging means, said extensions on said spring members exerting a weaker force than said portions of said spring members bearing on said partition member, other portions of said spring members extending at an angle to said rear housing and serving as said mounting means, the ends of said angular portions being bent inwardly to serve as said first-mentioned preventing means.

CHARLES O. ROLANDO.

No references cited.